March 9, 1926.  1,576,374
E. F. SPANNER
MECHANICAL FILTERING DEVICE
Filed Nov. 10, 1924     2 Sheets-Sheet 1
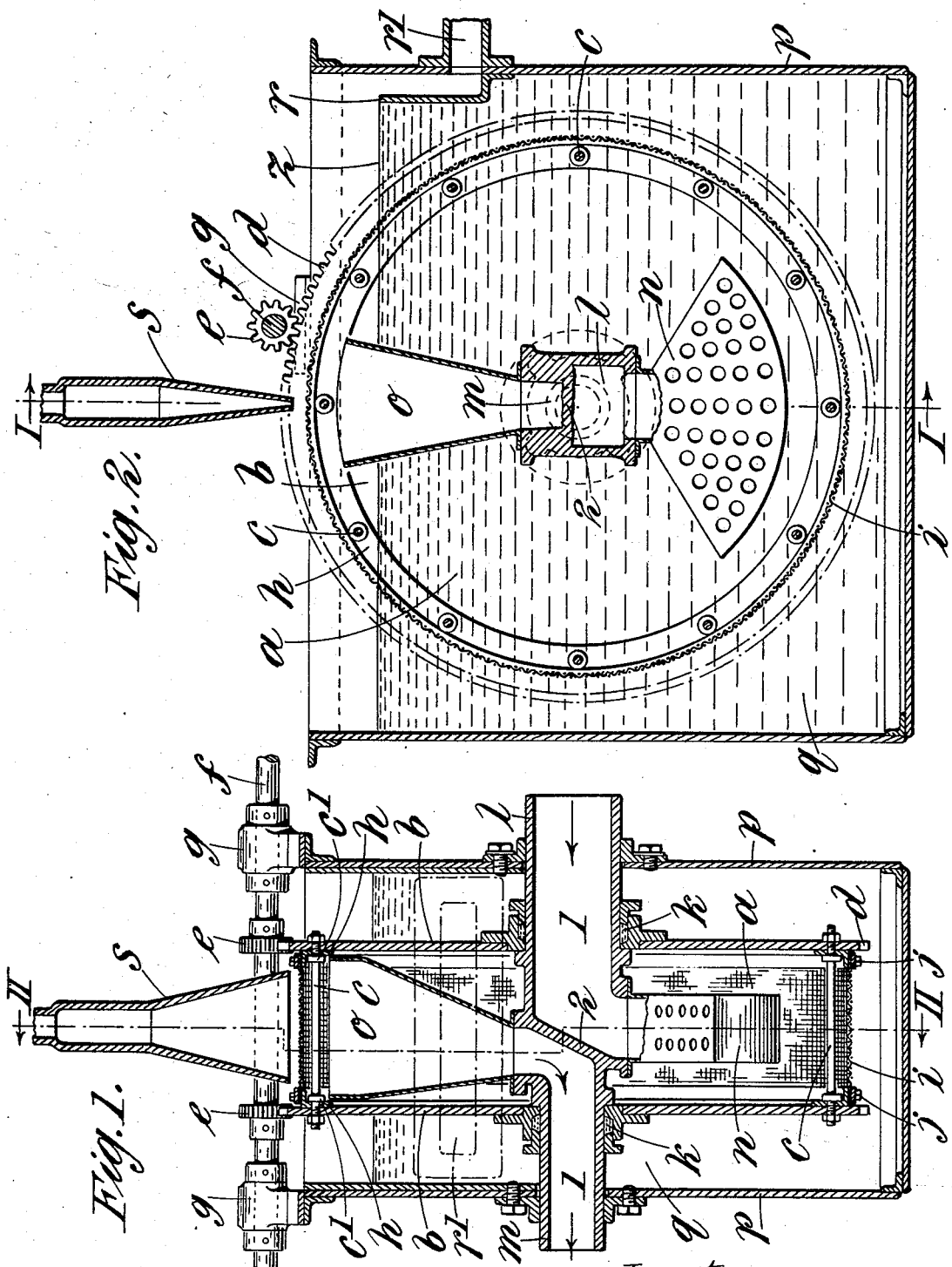
Inventor
E. F. Spanner
Per
Atty.

March 9, 1926.                    E. F. SPANNER                    1,576,374
                            MECHANICAL FILTERING DEVICE
                          Filed Nov. 10, 1924        2 Sheets-Sheet 2
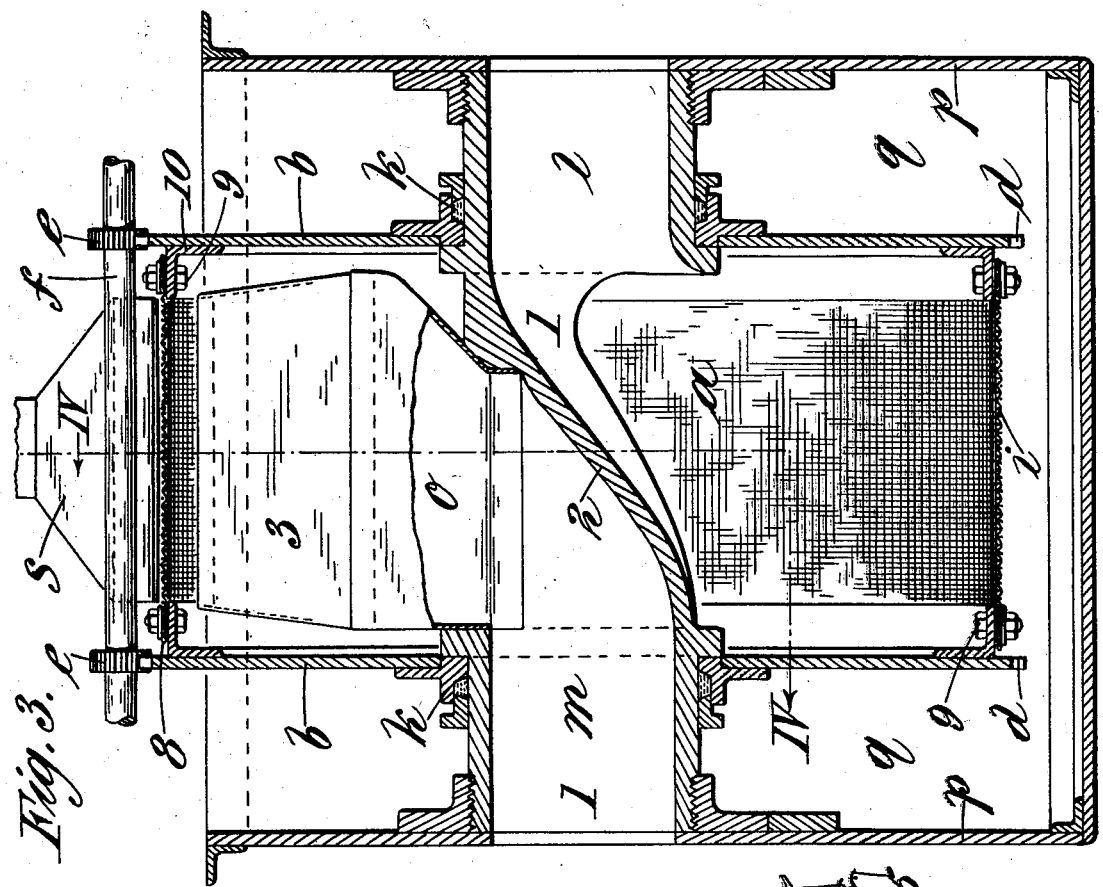
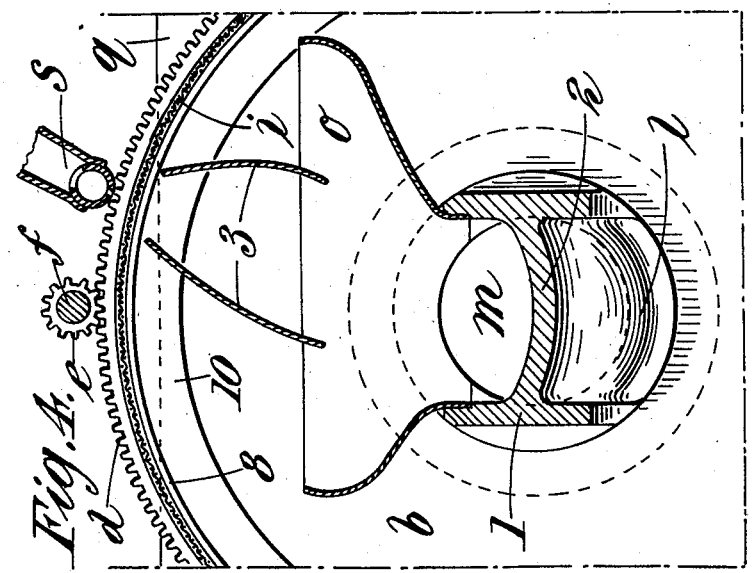
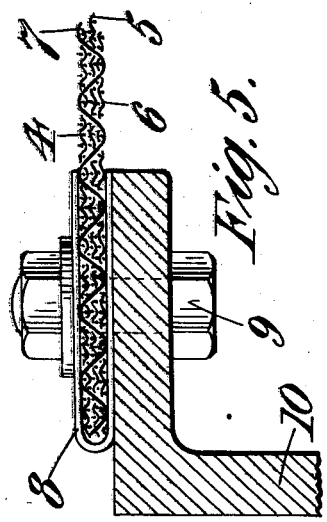
Inventor
E. F. Spanner Patented Mar. 9, 1926.

1,576,374

UNITED STATES PATENT OFFICE.

EDWARD FRANK SPANNER, OF BLACKHEATH, LONDON, ENGLAND.

MECHANICAL FILTERING DEVICE.

Application filed November 10, 1924. Serial No. 749,012.

*To all whom it may concern:*

Be it known that I, EDWARD FRANK SPANNER, a subject of the King of Great Britain, residing at Blackheath, London, England, have invented certain new and useful Improvements in Mechanical Filtering Devices, of which the following is a specification.

This invention relates to an apparatus for filtering liquids and while it is especially applicable for use on board ship for removing oil from water discharged from ships' fuel tanks, so as to avoid pollution of docks and other waterways, it may be used for removing oil or other impurities from other liquids.

For the purpose of removing oil from the water discharged from ships' fuel tanks it is desirable that the apparatus shall be as compact as possible commensurate with a high capacity and consequently it is desirable that the maximum area of filtering screen shall be in effective operation. Moreover, it is also desirable that, in a filter embodying a gauze or like filtering screen which is to separate or keep back the oil or impurities by entanglement with the meshes of the screen, or by surface tension, and for ultimate removal by an air blast or other equivalent means, the pressure difference between the liquid on both sides of the screen shall be very low, otherwise the oil or impurities will be liable to be forced through the screen. Provision should also be made to avoid undue pressure difference being set up in the event of the screen becoming choked so as to avoid the oil or other impurities being forced through the screen into the purified water, it being preferable that, in the event of the screen being choked, the oily water should find automatically another escape without setting up an undue head or pressure.

The invention consists in a filtering apparatus embodying features by which the above important conditions are effectively met.

In the drawings:—

Figure 1 is a sectional elevation of one form of apparatus according to the invention, the section being taken on line I—I, Figure 2.

Figure 2 is a transverse sectional elevation, the section being taken on the line II—II of Figure 1.

Figure 3 is a sectional elevation of part of another form of apparatus.

Figure 4 is a transverse sectional elevation, the section being taken on IV—IV, Figure 3.

Figure 5 is a sectional view on a larger scale illustrating in detail a portion of one form of gauze screen and clamping device.

In the form of the invention illustrated by Figures 1 and 2 a drum $a$ comprises two discs $b$ $b$ connected by means of bolts $c$, and a gauze screen $i$. The discs $b$ $b$ are provided with teeth $d$ for engagement with the teeth of pinions $e$ $e$ mounted on a shaft $f$. The shaft $f$ is mounted in suitable bearings $g$ $g$ and is rotated from any suitable source of motion by known mechanical means. Rings $h$ are provided on the bolts $c$ between the discs $b$ $b$, said rings being maintained in place by collars $c'$ $c'$ on the bolts $c$. The gauze screen $i$ is connected to the rings $h$ $h$ by suitable screws $j$, which are so arranged as to stretch the gauze $i$ tightly in place. The discs $b$ $b$ are mounted on a stationary hollow shaft 1 and are provided with glands $k$ $k$. The hollow shaft 1 comprises an admission conduit $l$ for the liquid to be filtered and an exit conduit $m$ for the impurities or residue removed from the gauze $i$. The conduits $l$ and $m$ are separated by a septum 2.

One end of the conduit $l$ terminates within the drum and is directed downwards, the end of said conduit being provided with a perforated distributing box $n$. One end of the conduit $m$ also terminates within the drum $a$ and is directed upwards, the end of said conduit $m$ having a hopper or funnel $o$ mounted thereon. The conduits $l$ and $m$ serve as journals upon which the drum $a$ rotates, the said conduits being mounted in the walls $p$ $p$ of the tank $q$ in any appropriate liquid-tight way. The tank $q$ is provided with means for regulating the outflow of liquid therefrom so as to maintain a definite level therein, for instance, an overflow weir $r$ and a delivery conduit $r'$. Above the hopper $o$ and exterior to the gauze $i$, a nozzle $s$ is arranged, said nozzle being fed with a gaseous medium, such for example as air, under high pressure.

The funnel or hopper $o$ collects the material removed from the gauze $i$ by the blast.

In operation, the tank $q$ is filled with filtered fluid and the fluid to be filtered is introduced by the conduit $l$ and passes through the distributing device $n$ to the interior of the drum $a$, particles of greater specific gravity than the fluid containing them will settle on to the gauze $i$ whilst particles of lighter specific gravity than the fluid containing them, such for example as clean globules of oil, will rise to the surface $z$ of the fluid the level of which is predetermined by the height of the weir $r$.

The drum $a$ is continuously rotated by means of the pinions $e\ e$ and not only are the particles of greater specific gravity than the fluid which have settled on the gauze $i$ removed from the fluid, but also the layer of particles or globules of less specific gravity than the fluid which has formed on the surface $z$ within the drum are removed from the fluid the layer of light particles being gradually carried up by the gauze screen as it emerges from the fluid. During rotation of the drum, each part of the gauze in succession passes under the blast from the nozzle $s$ with the result that if the drum is rotated in the direction of the arrow $x$ that surface of the gauze $i$ to the left of the jet and above surface $z$ will be clean, whilst that part of the gauze to the right of the jet $s$ and above surface $z$ will require cleaning. The oily material removed from the gauze $i$ will be delivered into the hopper $o$ by the blast $s$, said material passing out from the device through the conduit $m$.

Should the percentage of oily impurities be so great that the rotating gauze is unable to clear them sufficiently rapidly the gauze will partly choke and the result will be that the level of the fluid in the drum $a$ will rise and the lighter oily portions will overflow down the funnel or hopper $o$. Again, if the air blast fails or the drum $a$ ceases to rotate, the level of the fluid in the drum $a$ will similarly rise and the fluid will be carried away down the funnel $o$ to the receptacle provided for the oil. These features are of very great importance as they provide an effective safeguard against a mishap resulting in oily water being pumped overboard.

The funnel $o$ extends near to the upper part of the drum $a$ and the weir $r$ is near to the upper part of the tank $q$, so that the major portion of the drum $a$ is always submerged, thus ensuring that the maximum area of filtering screen is in effective operation. Moreover, the upper edge of the funnel $o$ is only at a slightly higher level than the weir $r$ so that under all conditions there is only a very low pressure difference between the liquids on opposite sides of the guaze screen $i$.

The liquid flow through the screen may be therefore very gentle and will not be sufficient to overcome the entanglement or surface tension of the oil on the gauze screen, even should the screen be choked sufficiently to cause a rise of the liquid level in the drum, this low pressure difference being maintained both under normal and abnormal conditions.

In the form shown in Figures 3 and 4 the portion of hollow shaft 1 inside the drum is made of substantially H cross section so as to provide larger openings for the conduits $l$, $m$, and a septum 2 of a more gradually curved form more suitable for the guidance of the oil or other residue and air into the conduit $m$. A much wider funnel $o$ is also shown having a more extensive upper edge or perimeter not only enabling a blast nozzle $s$ to be used the full width of the gauze screen and ample area for the exit of oil and air but also presenting a longer overflow for the oily water to escape when the level in the drum rises for any reason. Vanes or guards 3 are fixed to the hopper or funnel $o$ to guide the oil or other residue into the funnel and prevent it being scattered over the edge thereof.

The gauze screen $i$ may comprise a single layer of wire mesh or a plurality of layers, for instance three as indicated in Figure 5 which are held in close relation by suitable means such as wire stitching, the separate layers being indicated by 4, 5 and 6 and the stitching by 7. By maintaining the layers of gauze in close relation full advantage can be taken of the surface tension of the oil clinging to the wire meshes not only on the peripheral surfaces of the layers but between adjacent layers. By holding the layers in fixed relation ballooning of the layers under the pressure of the air blast is avoided.

The layers of gauze 4, 5, 6, bound or stitched together may be clamped at the edges by metal strips 8 doubled and pressed firmly on the gauze and secured by bolts 9 to the flanges 10 on the discs $b$, $b$.

From the foregoing description it will be understood that the drum 1 except for the conduits $l$, $m$, and the gauze screen $i$ is sealed or closed, and that as the emergency outlet formed by the funnel $o$ is at a relatively high level in the drum, the major portion of the screen $i$ can be submerged in the water in the tank $q$, the level of which water is determined by a weir not shown but which is similar to that above described and shown in Figures 1 and 2.

By these means a maximum filtering area is obtainable for use under normal conditions with a low pressure difference at the screen $i$ and even should the screen be choked the funnel $o$ enables the liquid to escape from the drum without setting up sufficient head or pressure to force the oil through the screen.

The actual construction of the drum, means of attachment of the gauzes, arrangement of the air nozzles, method of drive and other details may be varied as desired depending on general circumstances in the ship or station, character of the oily mixture, or volume of mixture to be dealt with in a given time.

I claim:—

1. An apparatus for filtering oily water comprising a tank, a rotary drum within said tank and having a filtering screen of wire gauze, a hollow shaft for said drum divided by a partition, an opening in one division of said shaft to act as the inlet for oily water into said drum and a collecting funnel on the other division of said shaft to act as the outlet for oil and as an emergency outlet for water, an outlet for water from said tank arranged at a level sufficient to ensure that the major portion of said drum is submerged, said funnel being at a slightly higher level than said tank outlet, and an air blast nozzle above said drum and funnel for the purpose of blowing oil off the gauze screen of said drum into said funnel as said screen emerges from the water in the tank, substantially as hereinbefore set forth.

2. An apparatus for filtering oily water comprising a tank, a rotary drum within said tank and having a filtering screen comprising a plurality of closely arranged superposed layers of wire gauze, a hollow shaft for said drum divided by a partition, an opening in one division of said shaft to act as the inlet for oily water into said drum, and a collecting funnel on the other division of said shaft to act as the outlet for oil and as an emergency outlet for water, an outlet for water from said tank arranged at a level sufficient to ensure that the major portion of said drum is submerged, said funnel being at a slightly higher level than said tank outlet, and an air blast nozzle above said drum and funnel for the purpose of blowing oil off the gauze screen of said drum into said funnel as said screen emerges from the water in the tank, substantially as hereinbefore set forth.

3. An apparatus for filtering oily water comprising a rotary drum having a filtering screen comprising a plurality of closely arranged superposed layers of gauze, means for introducing the water to be filtered into said drum, a tank surrounding said drum for the reception of the water passing through said screen, means for maintaining a water level in said tank sufficient to submerge the major portion of the screen, a collecting funnel inside said drum, an air blast nozzle, means for rotating the drum to bring said screen as it emerges from the water in said tank past said nozzle for the removal of the oil entangled in said screen into said collecting funnel, said funnel forming an emergency outlet for water in said drum in the event of the screen being choked and being arranged slightly above the water level in said tank so as to ensure a low pressure difference at the screen.

4. An apparatus for filtering water comprising a rotary drum having closed sides and a gauze peripheral screen, a hollow stationary shaft for said drum, said shaft being a septum dividing it into two conduits, one an inlet conduit for water to be filtered and the other an outlet conduit for residue, said outlet conduit having a collecting funnel extending towards the upper part of said drum, an air blast nozzle arranged above said drum, a tank for containing said drum and for the reception of the water passing through said screen, means for rotating said drum to bring the screen as it emerges from the water in said tank past said air blast nozzle for the removal of the oil entangled in said screen to said collector, and a water outlet from said tank arranged slightly below the upper edge of said collecting funnel for the purpose of maintaining a water level in said tank sufficient to submerge the major portion of said screen and of permitting of an emergency overflow through said collector, with a low pressure difference at said screen, substantially as and for the purpose hereinbefore set forth.

5. An apparatus for filtering oily water comprising a tank, a rotary drum having a gauze filtering screen in said tank, means for introducing the water to be filtered into said drum, a weir for filtrate at the outlet from said tank to maintain the major portion of the screen submerged, an air blast nozzle for removing oil from the unsubmerged portion of screen, means for rotating said screen past said nozzle, a collecting funnel inside said drum for receiving the oil so removed, and directing vanes above said funnel for directing the oil into said funnel, said funnel having an overflow edge slightly above the level of said weir, substantially as hereinbefore set forth.

In testimony whereof I have signed my name to this specification.

EDWARD FRANK SPANNER.